April 27, 1965  N. W. MARANO  3,180,684
RECOIL SAFETY BELT
Filed Sept. 6, 1962  3 Sheets-Sheet 1

Inventor
N.W. MARANO

Kenyon, Palmer, Stewart & Estabrook
Attorneys

Inventor
N.W. MARANO
Attorneys

April 27, 1965    N. W. MARANO    3,180,684
RECOIL SAFETY BELT

Filed Sept. 6, 1962    3 Sheets-Sheet 3

Inventor
N.W. MARANO

Attorneys

United States Patent Office 3,180,684
Patented Apr. 27, 1965

3,180,684
RECOIL SAFETY BELT
Nello W. Marano, 55 Hollinsworth Bldg., Calgary,
Alberta, Canada
Filed Sept. 6, 1962, Ser. No. 221,820
3 Claims. (Cl. 297—388)

The present invention relates to safety belts.

There are many fields both of travel and construction work in which safety belts are used, and in the art of aviation safety belts are an essential equipment for use by both the pilot and navigator and also by the passengers.

In recent years it has been recommended that safety belts be made an essential part of automobile equipment for use by both the driver and the passenger, and the use of such equipment would tend to reduce danger to occupants arising out of travelling hazards such as collision, or when a vehicle becomes ditched, or many of the other hazards to which automobile travel is exposed.

One of the objects of my invention is to construct a safety belt which may be worn in comfort by occupants of aeroplanes and/or automobiles, and in which the safety belt when not in use, would be wound on a drum attached to or adjacent to a seat in an aeroplane or automobile.

Another object of my invention is to releasably secure or lock the free end of the safety belt in position when the belt is in actual use or when the belt is coiled on the drum, and on which drum the major portion of the safety belt is coiled when not in commission.

A further object of my invention is to construct a safety belt which may be readily and manually withdrawn or unwound from the drum on which it is mounted, and to resiliently rewind the safety belt on the drum when the belt is not in use.

Another object of my invention is to insure that the safety belt will always be comfortably tensioned around the waist or body of the wearer, permitting freedom of action by the wearer yet insuring that the wearer is safely retained in the seat or chair which he or she occupies during all normal travelling conditions.

A further object still of my invention is to position the belt locking device in proximity to the seat of the aeroplane or automobile in which a passenger is travelling so that the locking device is readily accessible to the occupant of the seat to release or secure the belt in locked position as and when required.

Further objects of my invention will be disclosed during the development of this specification.

So that the nature of my invention will be readily understood, I have illustrated an embodiment of the same which I shall describe in detail, but I wish it to be understood that I do not limit my invention to the specific device illustrated and described, but reserve the right to modify this structure within the scope of my appended claims without departing from the spirit of my invention.

In the drawings.

Like characters of reference refer to like parts in the several figures of the drawings.

Figure 1:
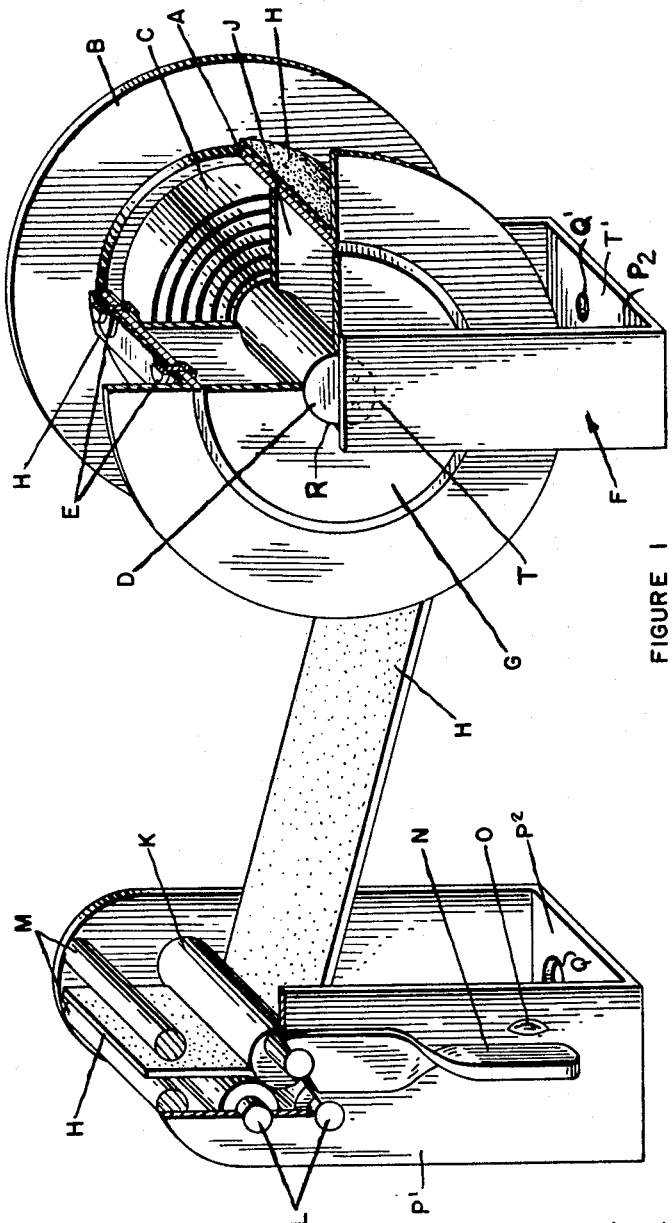
FIGURE 1 is a perspective view of my invention showing the belt winding drum and belt locking member, part of the cylindrical wall of the drum being broken away to show the central spindle and also showing the recoil or rectractable torsion spring for rotating the drum to wind the safety belt thereon.

Referring to the drawings, A represents a cylindrical drum which may be formed of metal or plastic or any other desirable material, and this drum is provided with end walls G, and the marginal portions of these walls constitute flanges B designed to embrace and co-act with the lateral walls of the belt H and guide the belt as it is being wound on, or unwound from the drum A.

Each end wall G is provided with a concentric aperture R, and these apertures are in alignment with the axis of the drum A, and a spindle D is mounted in the apertures R. The ends of the spindle D project beyond the end walls G and are secured to the lateral arms T of the channel shaped bracket F and the transverse member T' of the bracket is provided with apertures Q' through which bolts or screws pass to secure the bracket F in a predetermined position adjacent to a seat or chair on an aeroplane, automobile or other similar conveyance.

The peripheral wall of the drum A is provided with anchor bolts E to which one end of the safety belt H is secured or anchored, and the other end of the safety belt H is provided with a hook or buckle which co-acts with an anchor bracket not shown.

Figure 4:
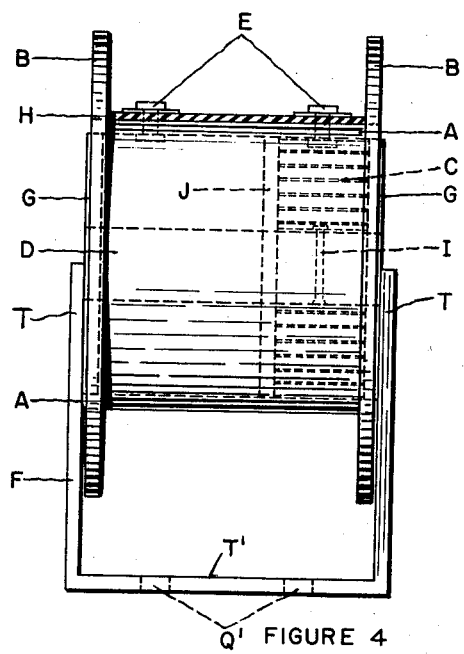
FIGURE 4 is an end elevation of the drum on which the safety belt is wound, and showing the location of the torsion spring which is secured at its outer end to the inner periphery of the drum, while the other end of the spring is secured to the drum spindle.

A recoil spring C encircles a portion of the spindle D and the inner end of the spring is firmly attached to the spindle while the outer end of the spring is firmly attached to at least one end of the bolts E. By reference to FIGURES 1 and 4 of the drawings it will be seen that the interior of the drum A is divided into two compartments by the division wall J, so that the recoil spring C is housed in one of these compartments and protected from injury by impact with external objects.

The side arms T of the bracket F may be secured to the spindle D by spot welding or other suitable means but the drum A is rotatable on the spindle and is rotated in a clockwise direction as the belt H is being unwound from the drum A, and the drum is rotated in an anti-clockwise direction as the belt H is being wound thereon under the action of the recoil spring C.

The safety belt H may be locked in any position intermediate of its length by the locking device P which consists of a channel shaped bracket having side arms P', and a transverse arm P², and this transverse arm is provided with holes or apertures Q, through which bolts may pass to secure the locking device P in a predetermined position relatively to the drum A. In the side arm P' a pair of guide rollers M are mounted in spaced relation, and these rollers may be rotatable or stationary as found expedient and intermediate of the height of the arms P', a roller K is eccentrically mounted and adjacent to the roller K a pair of spaced rollers L are positioned and the pair of rollers L and the eccentric roller K are arranged in staggered relation.

Rigidly secured to the eccentric roller K is a lever N the free end of which forms a hand grip and when the roller K is in its locking position relatively to the rollers L, then the free end of the lever N is in engagement with the detent or projection O on the bracket P. When the lever N is rotated in an anticlockwise direction it is first of all pulled slightly outwardly to become disengaged from the detent or projection O and then the lever is swung anticlockwise into a horizontal position in which the eccentric roller K is moved away from the adjacent roller L.

When the safety belt H is in use the free end of the belt is threaded between the eccentric roller K and the rollers L and then threaded between the rollers or guides M. The lever N is in its horizontal position so that the safety belt H may be unwound from the drum A to the desired extent permitting the belt to embrace the lower part of the body of the user, and the hook or buckle is then engaged with an anchor bracket not shown.

At this time there is an actual pressure of the belt on the body of the wearer, but if the wearer exerts a slight pull to the belt H so that the belt embraces the body comfortably to retain the person seated with comfort in the vehicle, then that person may swing the lever N downwardly to a vertical position to engage with the detent O and the safety belt H will be locked between the eccentric roller K and the space rollers L.

Figure 2:
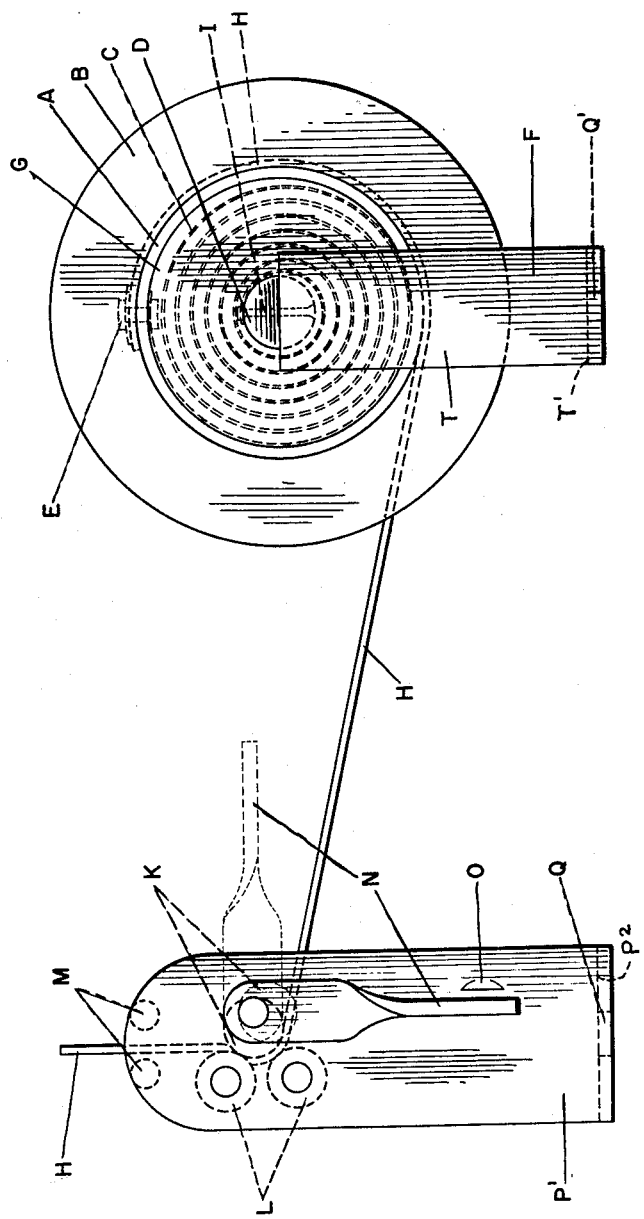
FIGURE 2 is a side elevation of the drum on which the safety belt is wound, and showing a side elevation of the locking member which co-acts with the projecting portion of the safety belt.
Figure 3:
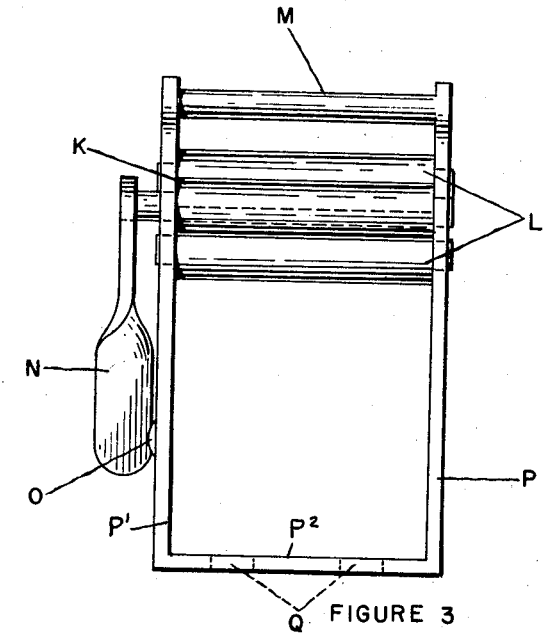
FIGURE 3 is an end elevation of the locking device which co-acts with the free end of the safety belt.

The user of the belt may remain comfortably seated in the vehicle in which this safety device is installed, and when leaving the vehicle the safety belt H may be disengaged from the anchoring bracket by unlatching the hook or buckle. The person is thus free to leave the seat, but before doing so he will hold the belt H with one hand and operate the lever N with the other hand bringing the lever into a horizontal position as illustrated in FIGURE 2, and in this position the safety belt H will be rewound on the drum A by the uncoiling of the spring C within the drum.

The rewinding of the safety belt H on the drum A will be stopped when the buckle is near the locking device P, at which time the person who has been using the belt will bring the lever N into a pendant position in engagement with the detent O. The major portion of the belt H will be rewound on the drum A but the free end of the belt will project slightly above the locking member P in a position convenient for use by the next occupant of the seat in the vehicle.

While I have described the use of a hook or buckle to be engaged to an anchoring bracket, it will be understood that any convenient form of fastening device can be used to secure the free end of the safety belt in position so that the belt will embrace the lower part of the body of the user of the safety belt. This buckle and bracket do not constitute part of my present invention which resides in the drum fitted with a recoil spring, and a locking device by means of which the safety belt projecting beyond the drum may be locked in position to control and resist tension of the safety belt on the drum and recoil spring thereby contributing to the safety and comfort of the person using my safety belt.

From the above description it will be clear that I have provided a safety belt and lock control therefor which is strong and rugged and not liable to go out of repair, and which will provide an added factor of safety to motorists and the flying public, so giving assurance to the public that the hazards of motoring and flying are being amply taken care of thereby contributing to the pleasure and safety of flying and motoring.

I claim:

1. The combination with a recoil spring controlled rotatable drum for a retractable safety belt, of a belt locking device comprising a bracket, a pair of spaced rollers mounted on the bracket, an eccentrically mounted roller on the bracket adjacent the two said rollers to receive the safety belt threaded between the spaced rollers and the eccentric roller, a manually operable lever connected to the eccentric roller, means for retaining the lever in a locking position, and guide means on the bracket co-acting with the free end of the belt.

2. The combination with a recoil spring controlled rotatable drum for a retractable safety belt, of a belt locking device comprising a channel shaped bracket having lateral arms connected by a transverse arm, a pair of spaced rollers mounted between the lateral arms, a roller eccentrically supported between the lateral arms and spaced from the said pair of rollers and positioned intermediate thereof, a hand lever connected to the eccentric roller, a detent on one of the lateral arms of the bracket co-acting with the hand lever in locked position, and a pair of spaced guide rollers mounted between the lateral arms of the bracket.

3. A locking device for a safety belt comprising a channel shaped bracket having lateral arms connected by a transverse arm, a pair of spaced rollers mounted between the lateral arms of the bracket, a roller eccentrically mounted between the lateral arms and spaced from the said pair of rollers, the said rollers being arranged in staggered relation, a hand lever operatively mounted on the eccentric roller, a detent on the bracket co-acting with the hand lever and a pair of spaced guide rollers located above the aforesaid rollers to co-act with a safety belt threaded between the first said pair of spaced rollers and the eccentric roller.

References Cited by the Examiner
UNITED STATES PATENTS

| | | | |
|---|---|---|---|
| 1,022,411 | 4/12 | Georgeson | 188—65.1 |
| 2,725,097 | 11/55 | Thoreson | 297—388 |
| 2,825,581 | 3/58 | Knight | 297—388 |
| 2,843,335 | 7/58 | Hoven | 297—388 |
| 2,852,270 | 9/58 | Hunt | 297—388 |
| 2,855,028 | 10/58 | Matthews | 297—388 |

FRANK B. SHERRY, *Primary Examiner.*